July 5, 1966 R. VOLKMANN 3,259,750

PHOTOSENSITIVE CIRCUIT AND SUPPORT

Filed April 1, 1963

INVENTOR

Richard Volkmann by Erwin Salzer atty.

United States Patent Office 3,259,750
Patented July 5, 1966

3,259,750
PHOTOSENSITIVE CIRCUIT AND SUPPORT
Richard Volkmann, Seligenstadt, Germany, assignor to Telefonbau und Normalzeit G.m.b.H., Frankfurt am Main, Germany, a firm
Filed Apr. 1, 1963, Ser. No. 269,648
2 Claims. (Cl. 250—211)

This invention is concerned with electric circuits, and more particularly with electric circuits of the kind referred to as electronic circuits.

It is a general object of this invention to provide improved electric circuits or electric circuits which can be established at greatly reduced cost by combining certain circuit elements, and/or which can be established more rapidly and more readily than was possible heretofore by combining certain circuit elements.

It is another object of this invention to provide electric circuits capable of performing substantially the same tasks as so-called prinited circuits, yet being more flexible than so-called printed circuits.

Still another object of the invention is to provide basic circuit means or circuit building blocks adapted to be readily converted into one of a plurality of different circuits.

A further object of the invention is to provide an improved modular system for establishing electronic circuitry, and more particularly such a system which is predicated upon the application of photoconductors.

These and other objects and advantages of the invention will become more apparent from the ensuing detailed description thereof taken in connection with the accompanying drawings.

Figure 3:
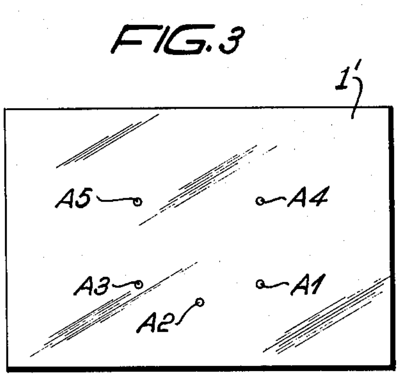
FIG. 3 is a view of a base plate adapted to support circuitry of the kind shown in FIGS. 1 and 2, seen from the side of said plate coated with a photoconductive layer.
Figure 4:
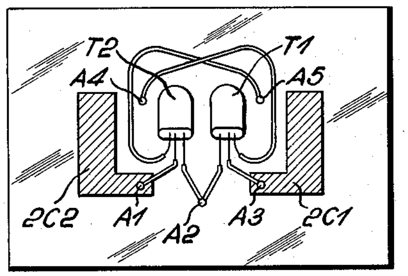
FIG. 4 is a view of the base plate shown in FIG. 3 seen from the reverse side thereof.
Figure 5:
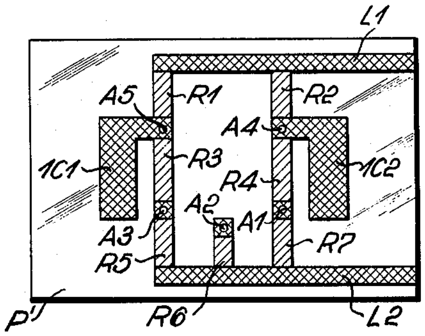
FIG. 5 is a view of a mask intended to be superimposed upon the base plate of FIGS. 3 and 4 to form the multivibrator of FIG. 1.
Figure 6:
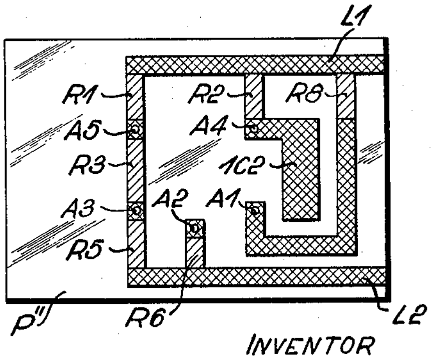
FIG. 6 is a view of another mask to be superimposed upon the base plate of FIGS. 3 and 4 to form the multivibrator of FIG. 2.

FIGS. 5 and 6 may also be considered as an illustration of various predetermined areas of the photoconductive layer on the plate of FIGS. 3 and 4 when selectively locally irradiated by incident light.

Figure 1:
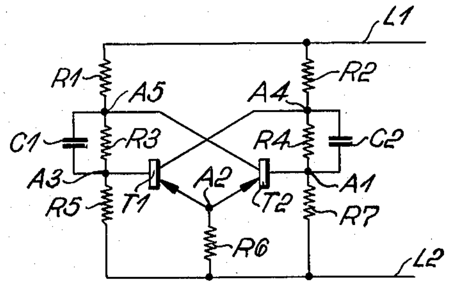
FIG. 1 is a wiring diagram of a bistable multivibrator comprising a pair of transistors.
Figure 2:
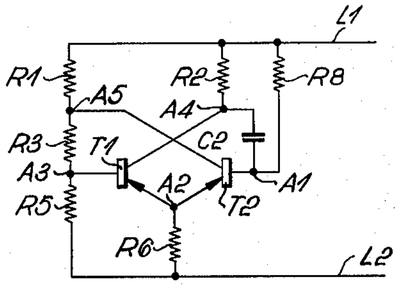
FIG. 2 is a wiring diagram of a monostable multivibrator comprising a pair of transistors.

The circuitry and the modes of operation of the multivibrators shown in FIGS. 1 and 2 are well known in the art, and hence do not require a detailed description thereof. The multivibrator shown in FIG. 1 comprises two transistors $T_1$, $T_2$, seven resistors $R_1$, $R_2$, $R_3$, $R_4$, $R_5$, $R_6$ and $R_7$, two capacitors $C_1$, $C_2$, leads or conductor means conductively connecting the two transistors $T_1$, $T_2$ in an ap-appropriate fashion to the five points $A_1$, $A_2$, $A_3$, $A_4$, $A_5$, conductor means $L_1$, $L_2$, and some additional conductor means for establishing the remaining conductive connections illustrated in FIG. 1. The multivibrator shown in FIG. 2 comprises two transistors $T_1$, $T_2$, six resistors $R_1$, $R_2$, $R_3$, $R_5$, $R_6$, $R_8$, one capacitor $C_2$, leads or means conductively connecting the transistors $T_1$, $T_2$ in an appropriate fashion to five points $A_1$, $A_2$, $A_3$, $A_4$, $A_5$, conductor means $L_1$, $L_2$, and some additional conductor means for establishing the remaining conductive connections illustrated in FIG. 2. The same reference letters have been applied in FIGS. 1 and 2 to indicate identical parts occupying identical positions. Thus the bistable multivibrator of FIG. 1 as well as the monostable multivibrator of FIG. 2 each comprise two identical transistors $T_1$, $T_2$ arranged in the same location, five identical resistors $R_1$, $R_2$, $R_3$, $R_5$, $R_6$ arranged in the same location, and one identical capacitor $C_2$ arranged in the same location. The capacitor $C_1$ and the resistors $R_4$ and $R_7$ of the circuitry of FIG. 1 are lacking in the circuitry of FIG. 2, and the resistor $R_8$ of the circuitry of FIG. 2 is lacking in the circuitry of FIG. 1. The circuitry of FIG. 1 is entirely symmetrical while that of FIG. 2 is not symmetrical.

As shown in FIGS. 3 and 4 plate *p* of insulating material is provided with five metal pins projecting transversely through plate *p* and arranged at the points $A_1$, $A_2$, $A_3$, $A_4$ and $A_5$ thereof. FIG. 4 shows the transistors $T_1$ and $T_2$ to be arranged on one side of plate *p* and the electrodes of transistors $T_1$, $T_2$ (base, collector and emitter) to be conductively connected to the pins arranged at points $A_1$, $A_2$, $A_3$, $A_4$ and $A_5$. The same side of plate *p* on which transistors $T_1$, $T_2$ are arranged supports two overlays of sheet metal $2C_1$, $2C_2$ of which each is provided with a connector tab. The connector tab of overlay $2C_1$ is conductively connected to the metal pin at point $A_3$ and the connector tab of overly $2C_2$ is conductively connected to the metal pin at point $A_1$. The side of plate *p* opposite to that shown in FIG. 4, i.e. the side of plate *p* shown in FIG. 3 is entirely covered with a layer 1' of a photoconductive semiconductor as, for instance, cadmium sulfide. The photoconductive layer 1' on the side of plate *p* shown in FIG. 3 is coextensive with the entire area of plate *p*.

The masks *p'* and *p''* shown in FIGS. 5 and 6 are intended to be superimposed upon the side of plate *p* shown in FIG. 3 to establish selectively either the circuitry of FIG. 1 or that of FIG. 2.

Referring now to FIGS. 5 and 6, the portions of the masks shown therein which are in plain white are supposed to be substantially opaque, precluding illumination of the areas of the photoconductive layer 1' situated under these portions and coextensive with these portions. The masks of FIGS. 5 and 6 have portions of intermediate opacity (or intermediate optical density) indicated by simple hatching. These portions are coextensive with interconnections of relatively high resistance to be established by the photoconductive layer 1' between points $A_1$, $A_2$, $A_3$, $A_4$ and $A_5$ between these points and other points to establish either the circuitry of FIG. 1 or the circuitry of FIG. 2. Masks *p'* and *p''* further have transparent portions, or portions of minimal opacity (or minimal optical density) which have been indicated in FIGS. 5 and 6 by cross-hatching. These substantially transparent portions including portions $L_1$, $L_2$ are coextensive with interconnections of relatively small resistance to be established by the photoconductive layer 1' between certain points of plate *p* to obtain either the circuitry of FIG. 1 or that of FIG. 2.

The mask shown in FIG. 5 includes two portions of minimal opacity $1C_1$ and $1C_2$ which are coextensive with the sheet metal overlays $2C_1$ and $2C_2$ on the rear side of plate *p* shown in FIG. 4 and with the connecting tabs thereof. The areas of the photoconductive semiconductor layer 1' coextensive with the transparent portions $1C_1$ and $1C_2$ of mask *p'* and overlays $2C_1$ and $2C_2$ form jointly the capacitors $C_1$ and $C_2$ indicated in FIG. 1. The mask *p''* shown in FIG. 6 includes a portion of minimal opacity $1C_2$ which is coextensive with sheet metal overlay $2C_2$ on the rear side of plate *p* and with connecting tab thereof. This sheet metal overlay and the area of the photoconductive layer 1' coextensive with portion $1C_2$ of minimal opacity jointly form the capacitor $C_2$ indicated in FIG. 2.

In FIGS. 5 and 6 reference characters $R_1$, $R_2$ . . . $R_7$ and $R_8$ have been applied to indicate the portions of masks $p'$ and $p''$ coextensive with the areas of the photoconductive layer 1' forming the resistors $R_1$, $R_2$ . . . $R_7$ and $R_8$ of FIGS. 1 and 2.

It will be apparent from the foregoing that a bistable multivibrator according to FIG. 1 or a monostable multivibrator according to FIG. 2 may be readily formed from the same basic modular structure shown in FIGS. 3 and 4 simply by operatively associating with that structure either the mask $p'$ shown in FIG. 5 or the mask $p''$ shown in FIG. 6.

If it is intended to form the monostable multivibrator of FIG. 2 capacitor $C_1$ must be dispensed with. This is achieved in the presence of sheet metal overlay 2$C_1$ on plate $p$ by the omission of a transparent portion on mask $p''$ substantially coextensive with, and arranged in registry with, overlay 2$C_1$. As clearly indicated in FIG. 6 the portion of mask $p''$ substantially coextensive with and arranged in registry with overlay 2$C_1$ is opaque and, therefore, the area of the photoconductive semiconductor layer 1' under that portion is always an insulator.

It will be further apparent that the conductivity of selected areas of the photoconductive semiconductor layer 1' increases with increasing exposure to light, thus making it possible to establish on that layer current paths having different ohmic resistances, the resistance of each particular current path being controlled mainly by the geometry of the particular portion of the mask by which the current path is defined and by the degree of optical opacity or density of said particular portion of the mask.

Circuit arrangements embodying the present invention call for light sources which have a sufficiently stable light output. This can readily be achieved by applying the particular light source from a voltage stabilized power source.

The masks for controlling the light distribution on the surface of the photoconductive layer 1' may be in physical engagement with the photoconductive layer. As an alternative, these masks may be arranged in spaced relation from the photoconductive layer 1' and associated with a projector and projected onto the photoconductive layer 1'.

It will be understood that this invention is not limited to the visible region of light and to photoconductive layers responsive to light within said region but encompasses any electromagnetic radiation in the nature of light and photoconductive layers responsive to the particular electromagnetic radiation.

It will be further understood that I have illustrated and described herein a preferred embodiment of my invention and that various alterations may be made in the details thereof without departing from the spirit and scope of the appended claims.

I claim as my invention:

1. An electric circuit comprising in combination:

(a) a supporting plate of insulating material;
(b) transistor means supported by said plate and arranged on one side thereof;
(c) resistor means arranged on the other side of said plate formed by predetermined illuminated areas of a photoconductive layer substantially coextensive with said other side of said plate;
(d) a mask covering said layer having opaque portions excluding light from other predetermined areas of said layer; and
(e) conductor means conductively interconnecting said transistor means and said resistor means, said conductor means including sections projecting transversely through said plate.

2. An electric circuit comprising in combination:

(a) a supporting plate of insulating material;
(b) transistor means supported by said plate and arranged on one side of said plate;
(c) capacitor means supported by said plate, said capacitor means including a pair of electrodes spaced by said plate, one of said pair of electrodes being formed by a metal overlay on said one side of said plate, and the other electrode of said capacitor means being formed by a predetermined illuminated area of a photoconductive layer on the other side of said plate;
(d) resistor means arranged on said other side of said plate formed by other predetermined illuminated areas of said layer;
(e) a mask operatively related to said layer for establishing on said layer areas exposed to different intensities of incident light; and
(f) conductor means operatively interconnecting said transistor means, said capacitor means and said resistor means, said conductor means including sections projecting transversely through said plate and said conductor means further including illuminated areas of said layer.

References Cited by the Examiner

UNITED STATES PATENTS

| | | | |
|---|---|---|---|
| 3,106,643 | 10/1963 | Anderson | 250—213 X |
| 3,165,634 | 1/1965 | Raymond | 250—213 |
| 3,191,040 | 6/1965 | Critchlow | 250—213 X |

RALPH G. NILSON, *Primary Examiner.*

WALTER STOLWEIN, *Examiner.*